(No Model.)

W. GARRETT.
METHOD OF MAKING TIN PLATE SHEETS.

No. 339,285. Patented Apr. 6, 1886.

WITNESSES:
Darwin S. Wolcott
C. M. Clark

INVENTOR,
William Garrett
BY George H. Christy
ATTORNEY.

UNITED STATES PATENT OFFICE.

WILLIAM GARRETT, OF PITTSBURG, PENNSYLVANIA.

METHOD OF MAKING TIN-PLATE SHEETS.

SPECIFICATION forming part of Letters Patent No. 339,285, dated April 6, 1886.

Application filed December 7, 1885. Serial No. 184,965. (No model.)

*To all whom it may concern:*

Be it known that I, WILLIAM GARRETT, residing at Pittsburg, in the county of Allegheny and State of Pennsylvania, a citizen of the United States, have invented or discovered certain new and useful Improvements in the Manufacture of Tin Plates, Sheets, &c., of which improvements the following is a specification.

Figure 1:
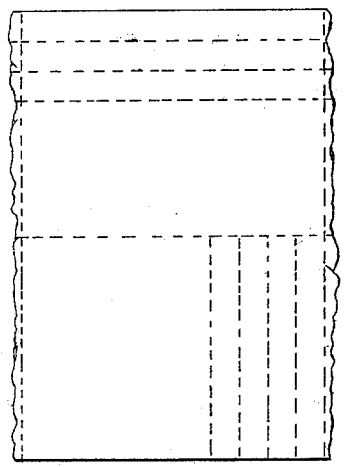
Figure 2:
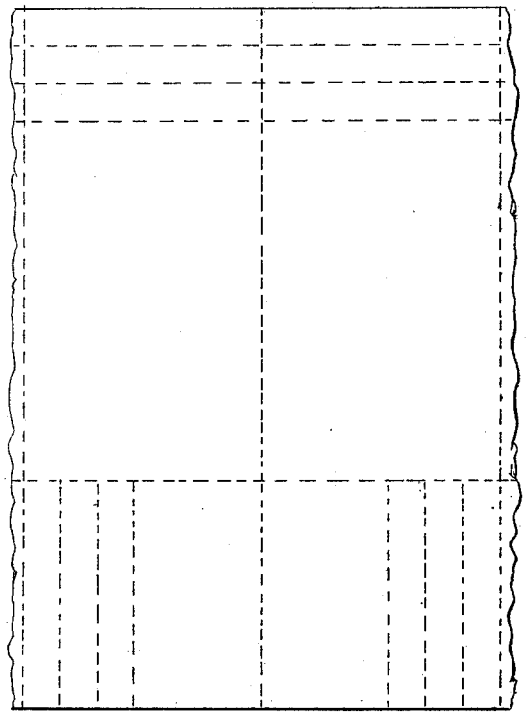

In the accompanying drawings, which make part of this specification, Figure 1 is a plan view of a plate, showing by dotted lines the manner of cutting such plates to form sheet-bars. Fig. 2 is a similar view of a double plate.

The invention herein relates to certain improvements in the art of manufacturing steel sheets and tin-plate, and has for its object the reduction of steel ingots to the form of sheet-bars without any intermediate heating during such reduction.

The method of producing steel sheets and tin-plate as heretofore practiced consisted in first reducing by suitably-formed rolls an ingot weighing from two thousand five hundred to three thousand pounds to the form of blooms five or six inches square and two feet long, approximately. These blooms were then heated and reduced in the ordinary method of rolling to bars having an approximate width of six or seven inches and a thickness varying from three-eighths to one-half of an inch. These bars were then cut up into the desired lengths, and after being heated were rolled into sheets or tin plates.

The above method is expensive and slow, owing to the time lost and fuel expended in the repeated reheatings required and to the loss arising from "cross-ends" of the bars.

In carrying out my invention, I take a properly-heated ingot and reduce it without any intermediate heating to a plate having the thickness desired in the sheet-bar. The dimensions of these plates may be varied to suit the capacity of the mills in which they are rolled—as, for instance, the sheets may be rolled of a width approximately equal, after trimming the edges to the length desired in the sheet-bars, as shown in the upper portion of Fig. 1, the sheet-bars being formed by cutting the plate transversely, as indicated by dotted lines; or the plate may be made of a width equal to the width of a number of bars and of a length equal to two or more bars, as shown in Fig. 1, the bars being formed by cutting the plates transversely and longitudinally, as indicated by dotted lines. A third manner of producing these sheet-bars consists in rolling the plates to a width equal to the combined length of two or more bars, and then, after trimming the plates, to cut the same transversely and longitudinally, as indicated at the upper portion of Fig. 2; or they may be cut as indicated in the lower portion of Fig. 2—*i. e.*, in sections of a width equal to the length of the sheet-bar by cuts transverse of the plate, said sections being subsequently divided up to form the sheet-bars by a series of cuts transverse of such sections.

In reducing the bars thus formed to sheets said bars are fed laterally between suitably-shaped rolls. As the bars are fed laterally in reducing them to sheets, such bars as are produced in the manner shown in the upper portions by cuts transverse of the length of the plate are rolled in the same direction as the original plate, and do not, therefore, show the same ductility when tested in directions transverse to the rolling as they will when tested in directions parallel to the rolling. Hence I prefer to cut up the plate in such a manner—*i. e.*, as shown in the lower portions of Figs. 1 and 2—that the action of the rolls on the bars will be transverse or approximately at right angles to the direction in which the plate was rolled. The sheets produced in this manner will have a greater homogeneity than is possible in any other manner of rolling.

I claim herein as my invention—

1. As an improvement in the art of manufacturing steel sheets or tin plates, the herein-described method, which consists in reducing steel ingots in suitable rolls directly to plates of the thickness of sheet-bars, or approximately so, at a single heat, cutting such plates into sheet-bars, and finally reducing the sheet-bars so formed into sheets or tin plates by cross-rolling, substantially as set forth.

2. As an improvement in the art of manufacturing steel sheets or tin plates, the herein-described method, which consists in reducing steel ingots in suitable rolls to plates of the thickness of sheet-bars, or approximately so, at a single heat, cutting such plates into sheet-bar by a series of cuts parallel to the direction in which the plates were rolled, and finally reducing the sheet-bar so formed into sheets or tin plates by cross-rolling in suitable rolls, substantially as set forth.

In testimony whereof I have hereunto set my hand.

WILLIAM GARRETT.

Witnesses:
　DARWIN S. WOLCOTT,
　W. B. CORWIN.